Feb. 11, 1969 E. E. LAPIN ETAL 3,427,200

LIGHT CONCENTRATOR TYPE PHOTOVOLTAIC PANEL HAVING CLAMPING MEANS FOR RETAINING PHOTOVOLTAIC CELL

Filed Sept. 24, 1964 Sheet 1 of 2

ELLIS E. LAPIN
ALAN W. ERNEST
PHILIP A. SOLLOW
INVENTORS

BY Edward O. Ansell
ATTORNEY
Norman L. Chalfin
AGENT

Feb. 11, 1969 E. E. LAPIN ETAL 3,427,200
LIGHT CONCENTRATOR TYPE PHOTOVOLTAIC PANEL HAVING CLAMPING MEANS FOR RETAINING PHOTOVOLTAIC CELL
Filed Sept. 24, 1964 Sheet 2 of 2

ELLIS E. LAPIN
ALAN W. ERNEST
PHILIP A. SOLLOW
INVENTORS

BY Edward O. Ansell
ATTORNEY
Norman L. Chalfin
AGENT

United States Patent Office 3,427,200
Patented Feb. 11, 1969

3,427,200

LIGHT CONCENTRATOR TYPE PHOTOVOLTAIC PANEL HAVING CLAMPING MEANS FOR RETAINING PHOTOVOLTAIC CELL

Ellis E. Lapin, Santa Monica, and Alan W. Ernest, and Philip A. Sollow, Glendora, Calif., assignors to Aerojet-General Corporation, Azusa, Calif., a corporation of Ohio Filed Sept. 24, 1964, Ser. No. 398,947
U.S. Cl. 136—89 1 Claim
Int. Cl. H01m *29/00;* H01g *9/20*

ABSTRACT OF THE DISCLOSURE

This disclosure concerns a photovoltaic device which comprises a plurality of photovoltaic modules, each including a solar cell having its own individual reflecting surfaces. The cell of each module is disposed in a pocket formed by the lower ends of the walls providing the reflecting surfaces therefor. The walls include an inwardly crimped portion at the lower ends thereof which overlaps the upper edge of the cell so as to clamp and retain the cell in proper position in the pocket without requiring an adhesive cement.

The present invention relates to photovoltaic devices and particularly to means for increasing the amount of light received by the devices to obtain an increased output of electric current therefrom.

The use of photovoltaic devices to generate electrical power is well understood. Such devices responsive to the radiant energy of the sun are known as solar cells and are widely used on spacecraft in arrays comprising a multiplicity of cells formed into panels.

Particularly in the case of spacecraft, such solar cell installations should be as light as possible. The required electrical output should be obtained with a minimum number of solar cells, because such cells are very expensive. Furthermore, such installations should be as free as possible from deterioration caused by conditions encountered in space. Especially in cases where the spacecraft may encounter the atmosphere of the earth, the solar cell installation should cause minimum interference with the course calculated for the craft. The last mentioned requirement is particularly important, since most spacecraft are launched from the surface of the earth, and at least initially in the flight, the solar cell arrays mounted on the craft must lie against the surface of the spacecraft. Erecting elements are provided to bring the solar panels into operative position at a later time in the flight.

For maximum efficiency, solar cells have typically comprised several elements cemented together. This cement is subject to deterioration, and the assembly of the elements using the cement is time-consuming.

It has been proposed that an entire panel of solar cells be surrounded with reflective walls. This would create an aerodynamically bulky structure for use in spacecraft.

It is the general object of this invention to provide a solar cell assembly particularly adapted for use on spacecraft and free from the various disadvantages of the presently known structures.

It is another object of the invention to provide an improved solar cell module construction upon which a greater amount of light than has previously been possible may be concentrated onto each solar cell so as to obtain an increased output of electric current therefrom and thereby to produce a required output with fewer cells than needed in present constructions, thus realizing a saving in weight of the modules.

Another object of the invention is to provide a solar cell module which may be readily combined with a plurality of other modules to provide a panel of lighter weight and better adapted for use on spacecraft, the panel being more rigid and more efficient in the generation of electric power from solar illumination than known solar cell panels.

A further object of the invention is to provide an improved mounting for a solar cell to hold the elements of the cell together and to retain it in its mount without need for adhesives, thus not only providing cells with improved performance when used in space for extended periods of time, but also simplifying the assembly of the cell which can be accomplished in less time.

These and other objects and features of the invention will become clearer from the following description and the appended claims taken together with the accompanying illustrative drawings, in which:

Figure 1:
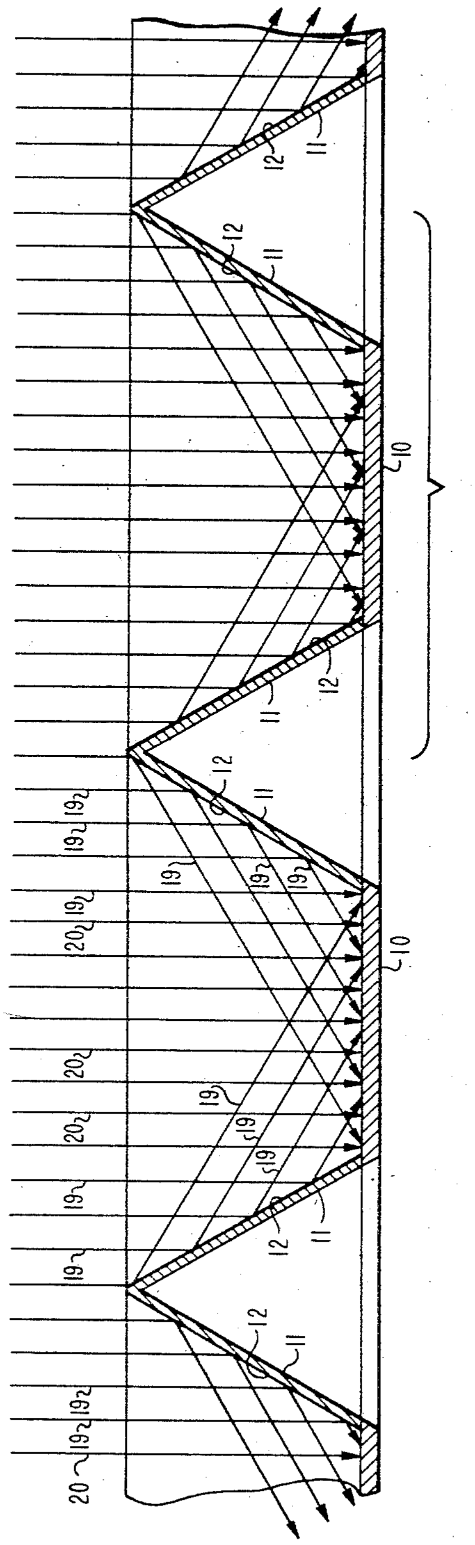
FIGURE 1 is a sectional view, diagrammatic in form, and showing the geometric arrangement of an array of solar cells.

Referring now to FIGURE 1 in which a cross-section of an array of cell modules is shown, the basic geometrical form of each solar cell module comprises the cell, generally indicated at 10, with circumscribing walls 11. In the embodiment being described, the cell 10 is shown as square and the walls 11 of a width equal to the width of the cell, and sloping outwardly at an angle of 60° from the plane of the cell face. The described construction results in a "module" or unit with four times the surface area of the face of the cell and a height from the base less than the width of the walls.

It is to be understood that the details given are for a particular embodiment only, since the shape of the cell may be of a different configuration, the angle of the walls may be different, and their dimensions may have different proportions within the scope of the invention.

For example, the wall structures 11 shown as having a plane surface may have a conical configuration surrounding the cell. In the particular case where the cell has a circular surface configuration, a conical outwardly sloping wall would provide reflectivity to all parts of the cell surface.

The inwardly facing surfaces of the walls have a highly reflective coating 12 thereon such that substantially all of the light indicated by lines 19 falling on the reflecting surfaces 12 of the walls 11 is reflected onto the exposed surface of the solar cell 10. The surface of cell 10 also receives the light directly indicent thereto as indicated by rays 20. Thus, light (rays 19, 20) falling on cell 10 due to the reflection from angled positions of walls 11 and from direct rays has an intensity at least 3 times as great as the direct rays 20 alone. The three fold ratio can be varied by changes in surface and shape of the reflective surfaces 12 of the walls 11 and their angles with respect to cell 10.

Figure 2:
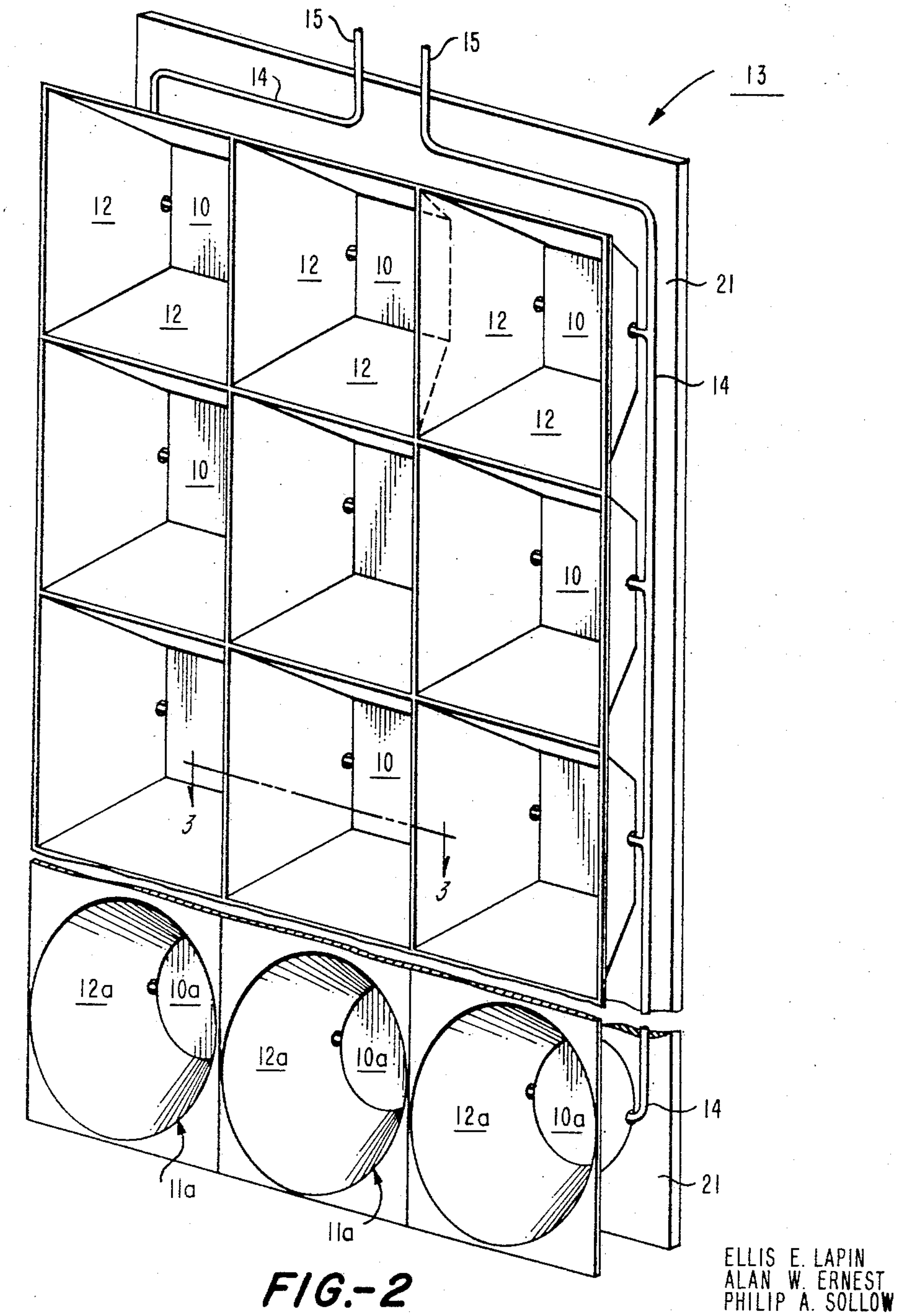
FIGURE 2 is a perspective view drawn to a smaller scale than FIGURE 1 and showing a section of panel formed by connecting together four of the arrays of solar cells and reflectors shown in FIGURE 1.

The individual modules are formed in panels, a section 13 of which is shown in FIGURE 2, having the appearance of a waffle when the modules are of the size generally suitable for spacecraft, such as for instance, having solar cells 10 about 2 cms. square.

All of the solar cells 10 are connected by wires 14 in a series-parallel circuit arrangement that will provide the desired current and voltage at the wire terminals 15.

Figure 3:
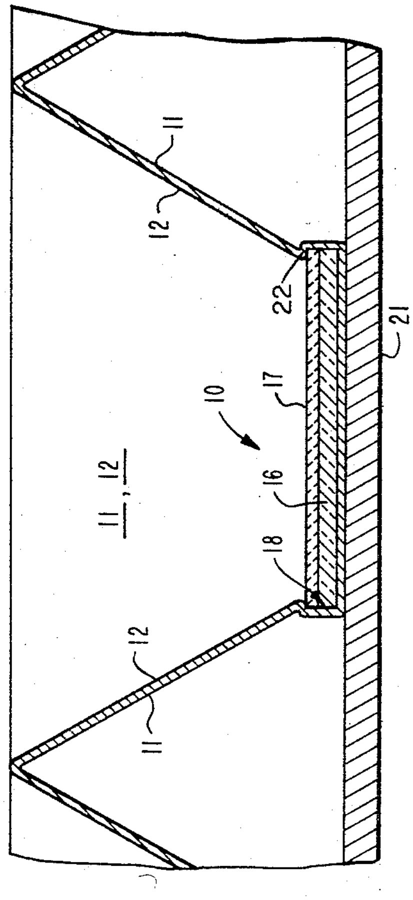
FIGURE 3 is a fragmentary enlarged sectional view showing the assembly of an individual solar cell in its reflector unit without the use of an adhesive cement between the elements of the cell.

As shown in FIGURE 3, each solar cell generally indicated at 10 comprises the cell 16 itself covered by a glass cover 17 of an appropriate transmission characteristic for the light rays 19 and 20. These components preferably are held together by suitably shaping the pocket 18 formed by the lower end portions of the walls 11 to clamp cell 16 and cover glass 17 tightly together. In this connection, the mouth of the pocket 18 formed by the lower end portions of the walls 11 may be bounded by an inwardly crimped portion 22 formed in the lower end portions of the walls 11. The inwardly crimped wall portion 22 overlaps the upper edges of the cell 16 and the glass cover 17, with the inwardly crimped wall portion 22 engaging the upper edge of the glass cover 17 so as to clamp and retain the cell 16 and the glass cover 17 in proper position within the pocket 18 without requiring an adhesive cement. The usual shield to protect the cell against corpuscular radiation is provided by the metal of the reflective member. In current practice, the cell components such as 16, 17 are secured together by an organic cement, but this cement may be damaged by prolonged exposure to the space environment. The parts may, of course, be secured in place if preferred by the use of cement, as for instance, for flights of short duration.

The formed array of solar cells is mounted on a base 21 which may be a thin plate or sheet of honeycomb material, the bottoms of the pockets 18 for the solar cells 10 being secured to base 21 by any suitable bonding method. One such method might be brazing or soldering.

Because of the honeycomb-like structure of the panel 13 including the array of cells 10 and the base 21, it is very light and rigid, and because of the greater output of the individual solar cells 10 due to the greater amount of light directed onto the cells by the described reflector surfaces 12 provided by the walls 11, the panel 13 of solar cells 10 is at least no heavier than one constructed according to prior art practices. The construction of this invention requires fewer solar cells for the same electrical output in a given radiation environment and will obviously be lighter than a panel requiring a greater number of cells as used in the prior art.

In a typical panel constructed according to this invention, the reflector panel elements 11 were formed from .001" brass sheet and the reflecting surfaces 12 were nickel plated thereon. The entire assembly of cell modules was secured to a relatively thin metal base 21 which is heavier, however, than panel elements 11. The resulting panel 13 was thin, light, and rigid, and under test provided a large increase of electrical power as compared with the same cells tested without the reflector, panel elements 11 and the reflecting surfaces 12 thereon.

An operative embodiment of the invention has been described herein and shown by way of illustration in the drawings. Another embodiment involving angled conical reflective walls has been described and a fragment thereof is shown in FIGURE 2 with conical walls being indicated at 11*a*, the reflective inner surfaces 12*a* thereof surrounding a cell 10*a* which may have a circular shape. Operation of surfaces 12*a* to reflect light onto cell 10*a* is the same as previously described for cell 10, and reflective surfaces 12 of walls 11.

The embodiments described and shown herein should not be construed as being necessarily limiting in scope, since various modifications may be made by those skilled in the art within the spirit of the invention and the ambit of the appended claim.

We claim:

1. A photovoltaic panel comprising: a plurality of photovoltaic modules; each of said modules comprising a photovoltaic cell for generating an electric current in response to light impinging thereon, thin walls surrounding said cell and inclined outwardly from the edges of said cell, inwardly facing reflective surfaces on said walls arranged so as to direct the light incident upon said reflective surfaces onto said cell to augment the light directly impinging on said cell, thereby to increase the electrical current generated by said cell in response to said augmented light, the lower ends of said walls being shaped to provide a pocket, said cell being disposed in said pocket, and means overlapping the upper edge of said cell for clamping and retaining said cell in correct position in said pocket; and adjacent modules of said plurality of modules being arranged in juxtaposed relation with respect to each other to define a uniform array of said modules.

References Cited

UNITED STATES PATENTS

| | | | |
|---|---|---|---|
| 2,904,612 | 9/1959 | Reginier | 136—89 |
| 2,919,298 | 12/1959 | Reginier et al. | 136—89 |
| 3,018,313 | 1/1962 | Gattone | 136—89 |
| 3,232,795 | 2/1966 | Gillette et al. | 136—89 |

ALLEN B. CURTIS, *Primary Examiner.*